July 12, 1966  C. A. DRAPER, JR  3,260,962
GATED PULSE GENERATOR WITH TIME DELAY
Filed Jan. 2, 1964
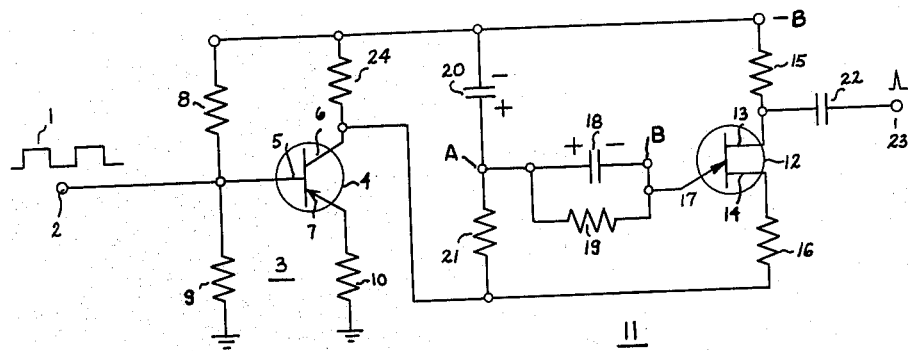
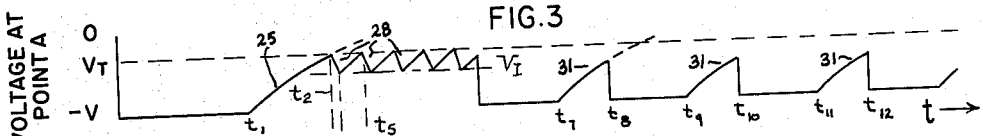
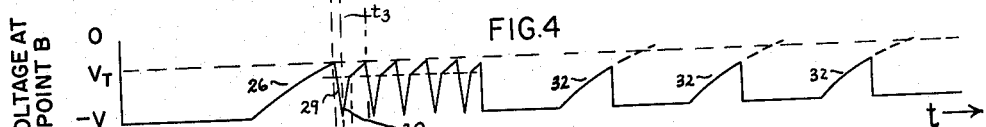
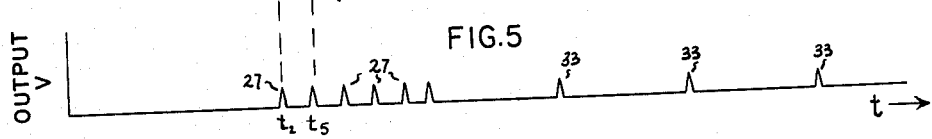
INVENTOR:
COSBY A. DRAPER, JR.
BY *J. David Blumenfeld*
HIS ATTORNEY.

United States Patent Office 3,260,962
Patented July 12, 1966

3,260,962
GATED PULSE GENERATOR WITH TIME DELAY
Cosby A. Draper, Jr., Lynchburg, Va., assignor to General Electric Company, a corporation of New York
Filed Jan. 2, 1964, Ser. No. 335,021
8 Claims. (Cl. 331—111)

This invention relates to a pulse generator and, more particularly, to an externally gated pulse generator wherein the generation of output pulses is inhibited for a fixed period of time after gating.

There is a need in many areas for a simple, solid-state gated pulse generator which incorporates a fixed delay after gating after which the generator becomes free-running. For example, such a pulse generator has utility as a triggering circuit or as a timing circuit. One use for such a pulse generator is as a trigger pulse source in a telephone signalling system. The pulse generator is gated in response to the signalling tones or tone pulses and produces, after the predetermined delay, triggering pulses to control the "E" switch relay of the signalling system, thereby selectively connecting the "E" lead to ground to effect the desired signalling function. Such a signalling system, utilizing the gated pulse generator of this invention, is described and claimed in a co-pending application Serial No. 335,206 filed on January 2, 1964, in the name of Cosby A. Draper, Jr., entitled "Signalling System," and assigned to the General Electric Company, the assignee of the present invention. It will, however, be appreciated that, though the gated pulse generator with time delay is particularly useful in the telephone signalling system described and claimed in the above-identified copending application, the instant invention has utility in other and different environments.

It is, therefore, an object of this invention to provide a gated pulse generator, the operation of which is delayed for a fixed period of time after being gated.

If the gating interval exceeds the fixed delay time, the pulse generator becomes free-running. If the duration of the gating interval is less than the fixed delay time so that the pulse generator never reaches its free-running state, the pulse generator functions essentially as a gated trigger producing a single output pulse on termination of the gating signal.

It is, therefore, a further object of this invention to provide a gated pulse generator having a fixed delay period after which it becomes free-running.

Yet another object of this invention is to provide a gated pulse generator which functions as a delayed trigger to produce a single output pulse at the trailing edge of gating pulses having a duration of less than the fixed delay time.

The pulse generator includes a first timing circuit for producing the fixed delay after gating and a further timing circuit which becomes operative after the first output pulse is produced to modify and change the time constant of the timing circuit and control the free-running repetition rate of the pulse oscillator.

It is, therefore, still another object of this invention to provide a pulse generator having a hybrid timing circuit effective to establish the initial delay and the subsequent free-running characteristics of the generator.

Other objects and advantages of the invention will become apparent as the description thereof proceeds.

In a preferred embodiment of the invention the delayed gated pulse generator includes a relaxation oscillator incorporating a solid-state switch such as a unijunction transistor. The relaxation oscillator has a first R-C timing circuit which is placed in the operative condition only upon the appearance of a gating signal to the oscillator. The first timing circuit has a time constant such as to establish the initial delay period before the solid-state unijunction switch is fired to produce the first output pulse. Upon appearance of the first output pulse a second timing circuit is effectively placed in circuit relationship with the first timing circuit to establish a hybrid timing circuit which controls the subsequent firing of the unijunction solid-state switch to establish the free-running repetition rate of the output pulses.

In the event that the gating pulse for enabling the relaxation oscillator has a duration less than that of the fixed delay period established by the first timing circuit, the oscillator functions as a delayed trigger device producing but a single delayed output pulse in response to the trailing edge of the gating pulse.

The novel features, which are believed to be characteristics of this invention, are set forth with particularity, in the appended claims. The invention itself, however, both as to its organization and method of operation, together with further objects and advantages thereof, may best be understood by reference to the following description taken in connection with the accompanying drawings in which:

FIG. 1 is a circuit diagram of the gated oscillator of the instant invention.

FIGS. 2–5 are waveform diagrams illustrating the operational conditions in various portions of the circuit and are useful in understanding the invention and its manner of operation.

FIG. 1 is a circuit diagram of a gated, delayed pulse generator constructed in accordance with the principles of the instant invention. Under certain conditions the gated generator produces a train of pulses after an initial delay, and, under other conditions, a single delayed trigger pulse at the trailing edge of the gating pulse. The gating signals 1 from a suitable source, not shown, are impressed on input terminal 2 of the gated pulse generator. The gating signals at terminal 2 are impressed on a transistor switch 3 which controls the pulse generator in response to the gating signals. Switch 3 includes a PNP transistor 4 having base, collector, and emitter electrodes 5, 6, and 7. The normal or static biasing conditions for transistor 4 are established by a voltage divider connected to base electrode 5 and are such that the transistor is normally conducting. The voltage divider consists of resistors 8 and 9 connected between ground and the negative terminal B— of a source of supply voltage. Base 5 is connected to the junction of the voltage divider resistances, and emitter 7 is connected to ground through emitter resistance 10 so that the base is more negative than the emitter, and the transistor is biased into conduction. As long as the voltage at input terminal 2 is at zero (0) volts or at a negative voltage, transistor 4 remains in the conducting state. The appearance of a positive voltage at input terminal 2 drives base 5 of the transistor more positive than emitter 7, and transistor 4 is biased to cut-off.

Transistor switch 3 gates a relaxation oscillator, shown generally at 11, in response to the gating pulses at terminal 2. Relaxation oscillator 11 includes a unijunction transistor 12 having bases 13 and 14 connected respectively to the B— terminal through resistor 15 and to collector 6 of transistor 4 through resistor 16. Emitter 17 is connected to junction B of an R-C network consisting of capacitor 18 and resistor 19 and thence to the junction A of the primary timing and delay circuit. The primary timing circuit, which consists of capacitor 20 and resistor 21, is connected between the B— terminal and collector 6 of transistor 4.

Unijunction transistor 12 functions essentially as a solid-state switch which is periodically driven into conduction. Initially, the firing of unijunction 12 is controlled by the primary timing circuit consisting of capacitor 20 and resistor 21 to establish the initial delay.

Thereafter, the firing of the unijunction is controlled by the hybrid timing circuit consisting of capacitor 20, resistor 21, capacitor 18 and resistor 19. Whenever the unijunction transistor is driven into conduction, a short trigger pulse is produced at base 13 which is then applied through a coupling capacitor 22 to an output terminal 23.

Unijunction transistor 12 is a solid-state semiconductor formed of a bar of $n$ type silicon having two ohmic contacts 13 and 14 which form the base electrodes of the device. A single rectifying junction is formed between emitter 17 and base 13. An interbase resistance of several thousand ohms normally exists between bases 13 and 14. With no emitter current flowing, the silicon bar acts like a simple voltage divider, and a certain fraction $\eta V_{BB}$, of the voltage across the bar appears at emitter 17. If the external voltage, applied at point B and to emitter 17, is less than $\eta V_{BB}$, which quantity is usually termed the intrinsic stand-off ratio of the unijunction transistor, the emitter is reverse-biased, and only a small emitter leakage current flows. If, however, the external voltage exceeds the intrinsic strand-off ratio, the emitter is forward-biased, and emitter current flows. This current consists primarily of holes injected into the silicon bar which holes move from emitter 17 to base electrode 13 and result in a corresponding increase in the number of electrons in the emitter-base region. As a result, there is a decrease in the resistance between the emitter 17 and base 13 so that as emitter current increases the emitter voltage difference decreases, and a negative resistance characteristic is obtained. For a further discussion of the characteristic and design criteria of the unijunction transistor, reference is hereby made to the "General Electric Transistor Manual," Third Edition, published by the General Electric Company, Semiconductor Products, 1224 West Genessee Street, Syracuse, New York (1958), pp. 56–62.

The operation of gated oscillator 10 and the manner in which the initial delay and subsequent frequency characteristics are achieved may be most easily understood in connection with the waveform diagrams of FIGS. 2–5. As long as the gating signal 1 is positive, PNP transistor 4 is biased into the nonconducting state since its base electrode is more positive than the emitter electrode, and the base-emitter junction is reverse-biased. Thus, during the period $t_0$–$t_1$ of FIG. 2, which shows the gating voltage variations with time, transistor 4 is biased into the nonconducting state. With the transistor in the nonconducting state, the resistance of the emitter-collector path is sufficiently large so that transistor 4 is essentially an open circuit. Collector 6 of transistor 4 is thus substantially at the voltage of the B— terminals. Both plates of capacitor 20 are, therefore, connected to the B— terminal; the upper plate directly, and the lower plate through resistor 21 and the collector resistor 24. The potential at junction points A and B is, as shown in FIGS. 3 and 4, approximately at the voltage level at the B— terminal; i.e., at —V. Both bases of unijunction transistor 12 are at the same potential as both are connected to the B— terminal, and no current flows; base 13 through resistor 15 and base 14 through resistor 16 and transistor-collector resistor 24. Thus, no interbase voltage, $V_{BB}$, exists across the silicon bar. Emitter 17 is reverse-biased, and no current flows.

At time $t_1$, the voltage at input terminal 2 drops to zero (0), and transistor 4 is biased into the conducting state. Transistor 4 conducts heavily to the point of saturation. The voltage drop across the emitter-collector path of the transistor, at saturation, is very low, on the order of a tenth of a volt or so, and collector 6 rises from the voltage at the B— terminal substantially to ground potential. A charging path to ground is now completed for capacitor 20 through resistor 21 and the emitter-collector path of transistor 4. Capacitor 20 begins to charge toward ground potential, and the voltage at junction A begins to rise from —V at the B— terminal towards ground at a rate determined by the time constant of capacitor 20 and resistor 21, as shown by Curve 25 of FIG. 3. The R-C time constant of capacitor 20 and resistor 21 establishes the initial delay time before the oscillator becomes freening. This time delay $|t_2-t_1|$ is the time required for capacitor 20 to charge sufficiently so that the potential at junctions A and B and at emitter 17 becomes sufficiently positive to exceed the intrinsic stand-off ratio and to forward-bias emitter 17. That is, the potential rise at junctions A and B must exceed the intrinsic stand-off ratio of the unijunction transistor so that the critical firing voltage at which the emiter becomes forward-biased is reached. During the interval $t_1$–$t_2$, the emitter is reverse-biased, and no emitter current flows. Consequently, capacitor 18 remains uncharged, and the potential variations at terminal B follow the potential variations at terminal A.

At time $t_2$, the voltage at junction A, as shown by Curve 25 of FIG. 3, and the potential at junction B, shown by the Curve 26 of FIG. 4, rises to the critical firing voltage $V_T$, and the junction becomes forward-biased. Holes are injected from the emitter 17 into the base region. These holes move toward base 13 and result in an equal increase in electrons in the emitter, producing an output pulse 27 at terminal 23 which is shown in FIG. 5. Capacitor 20 begins to discharge through resistor 19, the unijunction emitter-base region, and base 13 resistor 15 from $V_T$ towards —V, as shown at 28 of FIG. 3. However, because of the negative resistance characteristics between emitter 17 and base 13, the voltage difference between the emitter and the base drops very rapidly to the voltage at base 13 which is approximately that at the B— terminal. A potential difference now exists between the emitter, junction B, and junction A, with emitter 17 being more negative than junction A. Capacitor 20, which cannot discharge to the voltage at B— instantaneously, since its discharge path is determined in part by resistor 19, base resistor 15, and the emitter-base 13 resistance, has only discharged to a voltage $V_I$, intermediate $V_T$ and —V. Capacitor 18, which has a value of capacitance which is very small compared to that of capacitor 20 (on the order of $\frac{1}{50}$ to $\frac{1}{100}$ of the value), however, charges vary rapidly to a voltage equal to the difference between the voltages at emitter 17 and junction A with the polarity indicated. The voltage at junction B, and hence, the external voltage impressed on emitter 17, drops rapidly, as shown at 29 in FIG. 4, and at $t_3$ reaches —V which reverse-biases the emitter-base junction and drives unijunction 12 to cut-off.

Since capacitor 20 has only discharged to $V_I$ when unijunction 12 is cut-off, it now charges toward the triggering voltage $V_T$ through resistor 21 from this new level rather than from —V. Capacitor 18 now begins to discharge through resistor 19 from —V to the voltage level $V_I$ at junction A. The time required for capacitor 18 to discharge through resistor 19 is quite short compared to the time required for capacitor 20 to charge from the new voltage level $V_I$ to the firing voltage $V_T$, so that the voltage at point B rises rapidly, as indicated at 30 of FIG. 4.

In fact, the time constant of capacitor 18 and resistor 19 is made sufficiently small so that it has substantially no effect on the charge of capacitor 20 from $V_I$ to $V_T$. As shown in FIG. 4 at time $t_4$, capacitor 18 has discharged completely, and the voltage at junction B is the same as the voltage at junction A. The external voltage on emitter 17 is once again controlled by the voltage at junction A and the charging of capacitor 20 through resistor 21. At time $t_5$, the voltage at junction A has again risen to $V_T$, and emitter 17 is forward-biased, firing unijunction 12 and generating another output pulse 27. The whole cycle is repeated, and relaxation oscillator 11 enters its free-running mode. For the duration of the gating interval, the output pulses 27 have a repetition rate controlled by the R-C time constant of capacitor 20 and resistor 21 as modified by the effect of capacitor 18 and resistance 19 in limiting the voltage level to which capacitor 20 is discharged when unijunction 12 fires.

It is apparent, therefore, that during the gating period $t_1$–$t_6$, the primary timing and delay circuits, consisting of capacitor 20 and resistor 21, establish an initial delay period before the first output pulse is produced. After the first output pulse is produced, the second timing circuit, consisting of capacitor 18 and resistor 19, controls and limits the discharge of capacitor 20. This establishes in effect a hybrid timing circuit. By setting a new voltage level from which capacitor 20 charges toward ground thereby controlling the free-running repetition rate of the relaxation oscillator. At $t_6$, at the end of the gating interval, a positive voltage at terminal 2 biases transistor 4 into the nonconducting state. The voltage at collector 6 of transistor 4, therefore, drops from substantially ground potential to the potential at the B— terminal. Both bases 13 and 14 of unijunction transistor 12 are now at the potential of the B— terminal. There is no longer any voltage drop ($\eta V_{BB}$) between base 13 and the rectifying junction so that the junction is now at —V. The external voltage, applied to emitter 17, is the voltage at junction A which is still somewhere between voltage $V_I$ and voltage $V_T$ and is, hence, substantially more positive than —V. Unijunction transistor 12 is, therefore, driven into conduction, producing a trigger pulse at the output terminal 23. Since the interbase voltage $V_{BB}$ remains at zero the emitter remains forward-biased, and capacitor 20 discharges rapidly back to the voltage at the B— terminal and remains there until the oscillator is again gated by transistor 4. If the gating interval is less than the fixed oscillator delay period, oscillator 11 functions as a delayed trigger and produces a single output pulse for each gating pulse, which output pulse is generated in response to the trailing edge of the gating pulse. At time $t_7$, the voltage at input terminal 2 again drops to zero, and transistor 4 conducts. A charging path for the primary timing network, consisting of capacitor 20 and resistor 21, is once more established through the emitter-collector path of the transistor 4. Capacitor 20 begins to charge from the —V voltage towards ground. The voltage at junction A, as shown by Curve 31 of FIG. 3, therefore, rises towards the critical firing voltage $V_T$, as does the potential at junction B, as shown by Curve 32 of FIG. 4. At time $t_8$, before the voltages at junctions A and B reach the critical firing voltage of the unijunction transistor, the gating pulse is terminated. Since the voltage has not risen to the critical firing voltage $V_T$ the unijunction transistor 12 has not been fired, and no output pulse has been produced in an interval from $t_7$–$t_8$. Transistor 4 is biased into the nonconducting state, and the voltage at collector 6 of the transistor rises to the value at the B— terminal. Both bases 13 and 14 of the unijunction transistor drop to the voltage at the B— terminal, and the interbase voltage $V_{BB}$ drops to zero. The external voltage, applied to emitter 17, of the unijunction is that at junction A which is substantially more positive than —V. Emitter 17 is immediately forward-biased, causing the unijunction transistor to conduct and producing a short output pulse 33 at the trailing edge of the gating pulse. Capacitor 20 is rapidly discharged to —V and does not begin to charge until the oscillator is again gated. Hence, as long as the gating interval is less than the fixed delay time of the oscillator, the voltages at points A and B of the oscillator never reach the critical firing voltage $V_T$ before termination of the gating pulse, and no output pulses are produced in the interval. However, the termination of the gating pulse, which disables the switch 3, drives unijunction transistor 12 into the conducting state, producing a single output pulse at the trailing edge of the gating pulse, and oscillator 11 functions as a delayed trigger device.

One oscillator, which was constructed according to the principles of the instant invention which was found to operate satisfactorily and in the manner described, included the following components and their values:

Transistor 4 is a General Electric 2N1375 PNP transistor

| | |
|---|---|
| Resistor 8, kiloohms | 220 |
| Resistor 9, kiloohms | 5.6 |
| Resistor 10, ohms | 33 |
| Resistor 15, ohms | 470 |
| Resistor 16, ohms | 510 |
| Resistor 19, kiloohms | 5.1 |
| Resistor 21, kiloohms | 250 |
| Resistor 24, kiloohms | 51 |
| Capacitor 18, microfarads | .01 |
| Capacitor 20, microfarads | .47 |
| Capacitor 22, microfarads | .01 |

Unijunction transistor 12 is a General Electric 2N1671A unijunction transistor $$B{-}={-}36 \text{ volts}$$

While a particular embodiment of this invention has been shown, as will, of course, be understood that it is not limited thereto since many modifications, both in the circuit arrangement and the device employed, may be made. It is contemplated, by the appended claims, to cover any such modification as forward in the true spirit and scope of the invention.

What I claim as new and desire to secure by Letters Patent of the United States is:

1. A gated pulse generator with delayed operation after gating, comprising
    (a) a relaxation oscillator including a voltage responsive semiconductor switch which is driven into the conductive state and produces an output pulse if the voltage applied to one of its terminals exceeds a predetermined level;
    (b) a source of energizing voltage;
    (c) a first R-C network coupled to said source and to said switch;
    (d) gating means responsive to a gating pulse for completing a conductive path between said R-C network and said source, whereby the capacitor in said network charges toward the predetermined voltage and causes said switch to conduct and discharge said capacitor a fixed period of time after the appearance of a gating pulse;
    (e) a second R-C network for limiting the discharge of the capacitor of said first network whenever said switch conducts so that the capacitor of said first network begins to charge again towards said predetermined voltage level, said first network establishing the time required to generate the first output pulse after gating and said first and second network forming a hybrid timing network for establishing the free-running output pulse repetition rate after the first output pulse; and
    (f) means for producing an output pulse whenever said gating pulse terminates.

2. A gated pulse generator, according to claim 1, wherein said voltage sensitive switch comprises a semiconductor having a rectifying junction and said first and second networks are coupled to the terminal associated with the rectifying junction.

3. A gated pulse generator, according to claim 1, wherein said voltage sensitive switch comprises a unijunction transistor having two base electrodes and an emitter electrode, the first and second networks being coupled to the emitter electrode, whereby the voltages from said networks establish the external emitter voltage for said unijunction transistor to fire said transistor and produce an output pulse when the voltage exceeds the predetermined level.

4. A gated pulse generator with delayed operation after gating, comprising (a) a relaxation oscillator including a voltage responsive semiconductor switch which is driven into the conductive state and produces an output pulse if the voltage applied to one of the terminals exceeds a predetermined level;
(b) a source of energizing voltage;
(c) a first R-C network coupled to said source and to said switch;
(d) gating means responsive to a gating pulse for completing a conductive path between said R-C network and said source, whereby the capacitor in said network charges toward the predetermined voltage and causes said switch to conduct and discharge said capacitor a fixed period of time after the appearance of a gating pulse;
(e) a second R-C network for limiting the discharge of the capacitor of said first network whenever said switch conducts so that the capacitor of said first network begins to charge again towards said predetermined voltage level, said first network establishing the time required to generate the first output pulse after gating and said first and second network forming a hybrid timing network for establishing the free-running output pulse repetition rate after the first output pulse; and
(f) means for producing an output pulse whenever said gating pulse terminates, including circuit means coupled between said switch, said gating means and said source of energizing voltage to drive said switch into conduction and produce an output pulse whenever said gating pulse terminates, whereby at least one output pulse is produced even through the duration of the gating pulse is less than the fixed period of time required for the capacitor in said first network to charge to said predetermined level.

5. A gated pulse generator, according to claim 4, wherein said voltage sensitive switch comprises a unijunction transistor having two base electrodes and an emitter electrode, the emitter and one of said bases forming a rectifying junction; the first and second networks being coupled to said emitter to control the conduction of said unijunction transistor.

6. A gated pulse generator, according to claim 1, wherein said gating means includes a transistor connected in series with said voltage source and said first R-C network, said transistor being driven into the conducting state by a gating pulse to complete a conductive path for the capacitor in said first network and permit it to charge.

7. A gated pulse generator, according to claim 6, wherein the collector-emitter path of said transistor is connected in series between the voltage source, said first R-C network and ground.

8. A gated pulse generator with delayed operation after gating, comprising
(a) a relaxation oscillator including a voltage responsive semiconductor switch which is driven into the conductive state and produces an output pulse if the voltage applied to one of the terminals exceeds a predetermined level;
(b) a source of energizing voltage;
(c) a first network comprising a capacitor and resistor connected in series;
(d) gating means connected in series with said network and said voltage source for completing a conductive path in response to a gating pulse, whereby the capacitor charges toward the predetermined voltage level;
(e) one terminal of said switch being coupled to the junction of said capacitor and resistor of said first network through a second network consisting of a resistor and capacitor, said first network establishing the time required to generate the first output pulse after gating and the second network limiting the discharge of the first network whenever the switch conducts, whereby said first and second networks form a hybrid timing network which determines the free-running pulse repetition rate;
(f) means for producing an output pulse whenever said gating pulse terminates.

References Cited by the Examiner
UNITED STATES PATENTS 3,189,844    6/1965    MacKenzie _____ 331—111

ROY LAKE, *Primary Examiner.*

S. H. GRIMM, *Assistant Examiner.*